UNITED STATES PATENT OFFICE.

ROBERT HUBNER, OF ELIZABETH, NEW JERSEY.

PROCESS FOR BRIQUETING FLUE-DUST AND THE ARTICLE OF MANUFACTURE PRODUCED THEREBY.

1,038,370.     Specification of Letters Patent.     Patented Sept. 10, 1912.

No Drawing.     Application filed June 21, 1911. Serial No. 634,576.

*To all whom it may concern:*

Be it known that I, ROBERT HUBNER, a citizen of the United States, residing at Elizabeth, county of Union, State of New Jersey, have invented a Process for Briqueting Flue-Dust and the Article of Manufacture Produced Thereby, of which the following is a specification.

My invention consists in a process of treating flue dust containing iron, whereby there is produced porous briquets, which are sufficiently strong to bear the weight of the column of material in the blast furnace where they are employed, and sufficiently tough or resistant to break down only under such a temperature as is necessary to separate the iron from the bearing ore in the furnace.

To carry my invention into effect, I take flue dust, containing iron 90%, carbon 10%, 60 parts by weight, alumina clay 7.5 parts, silica 8.4 parts, lime 10 parts, magnesia 3.5 parts. These materials are thoroughly mixed, after which there is added hydrofluoric acid 0.6 parts; water, sufficient to convert the materials into a stiff plastic mass, after which, such mass is introduced into any suitable briqueting machine and formed into briquets. The percentage of hydrofluoric acid employed will depend upon the amount of iron contained in the flue dust, that is, the hydrofluoric acid will be increased as the percentage of iron is decreased. Further, the percentage of hydrofluoric acid may be from 0.6 parts to 5 parts by weight. Further, the percentage of silica will depend upon the amount of silica contained in the flue dust or associated with the alumina clay. What I wish to have understood is that the percentage of parts given, is approximate, but that the amounts specified for the several parts will be altered as the materials specified are found incorporated with other parts mentioned. Hence I do not limit myself to the proportions described of flue dust, alumina clay, silica, lime and hydrofluoric acid, provided that the mixture shall form a plastic mass which may be acted upon in a briqueting machine, form a highly basic slag, and a briquet which is strong, tough and porous.

The introduction of the hydrofluoric acid produces chemical combinations between the silica and the calcium, and fluorsilica and fluorcalcium are formed. When the briquets are introduced into the furnace and subjected to the temperature of the furnace, the presence of the fluoric acid produces a basic slag which is more fluid than the usual slag derived from a blast furnace. The slag so formed readily separates from the iron carried by the briquets and thus permits the iron to be collected with the reduced iron in the furnace.

Having thus described my invention, I claim:

1. The herein described process which consists in combining flue dust, clay, silica, lime, magnesia, hydrofluoric acid and water, in approximately the described proportions.

2. The herein described process which consists in combining iron flue dust, clay, silica, lime, magnesia, hydrofluoric acid and water in approximately the described proportions, and subsequently subjecting the mixture to mechanical manipulation to form briquets.

3. As a new article of manufacture, a briquet formed by subjecting flue dust, clay, silica, lime and magnesia to the action of a solution of hydrofluoric acid, and subsequently to the action of pressure to consolidate the materials in a portable form.

4. As a new article of manufacture, a briquet formed by subjecting flue dust, clay, silica, lime and magnesia to the action of a solution of hydrofluoric acid, and then subjecting it to limited pressure whereby a portable mass is formed which is porous, strong and infusible at any temperature below that at which metallic iron will be separated from the gangue combined therewith.

In testimony whereof, I affix my signature, in the presence of two witnesses.

ROBERT HUBNER.

Witnesses:
HELEN E. KOELSCH,
ELI WEILL.